United States Patent [19]

Kudo et al.

[11] Patent Number: 5,550,586
[45] Date of Patent: Aug. 27, 1996

[54] VIDEO CAMERA AND IMAGE INPUT DEVICE CONNECTED THROUGH SIGNAL LINE FOR TRANSFERRING MULTIPLEX DATA, AND IMAGE INPUT SYSTEM USING THEM

[75] Inventors: Yoshimichi Kudo, Fujisawa; Toshiro Kinugasa, Hiratsuka; Takuya Imaide, Fujisawa, all of Japan

[73] Assignee: Hitachi, Ltd., Tokyo, Japan

[21] Appl. No.: 409,690

[22] Filed: Mar. 24, 1995

[30] Foreign Application Priority Data

Mar. 28, 1994 [JP] Japan .................................. 6-056946

[51] Int. Cl.⁶ ............................................. H04N 5/225
[52] U.S. Cl. ......................... 348/222; 348/228; 348/552; 348/224
[58] Field of Search ................................... 348/222, 224, 348/228, 15, 14, 16, 552, 207, 347, 362, 220, 221, 363; H04N 5/225

[56] References Cited

U.S. PATENT DOCUMENTS

| | | | |
|---|---|---|---|
| 5,144,442 | 9/1992 | Ginosar et al. | 348/222 |
| 5,218,444 | 6/1993 | Mizutani et al. | 348/347 |
| 5,382,974 | 1/1995 | Soeda et al. | 348/221 |
| 5,420,635 | 5/1995 | Konishi et al. | 348/362 |

FOREIGN PATENT DOCUMENTS 6-276547  9/1994  Japan ............................ H04N 9/80

OTHER PUBLICATIONS

IEEE Transaction on Consumer Electronics, vol. 39, No. 3, Aug. 1993 pp. 467–473.

Primary Examiner—Safet Metjahic
Assistant Examiner—Glenton B. Burgess
Attorney, Agent, or Firm—Antonelli, Terry, Stout & Kraus

[57] ABSTRACT

A video camera including an imager and an analog-to-digital (A/D) convertor for converting video signals read out from the imager to digital image data, for applying the digital image data to an image input device for converting the digital image data to a data format used in an external information processing unit, through a signal line. The video camera further includes an input portion for inputting control data inputted thereto from the image input device through the signal line and producing an output, a control circuit for controlling operation states of the video camera in accordance with the control data from the input portion and a mode switching circuit. The mode switching circuit switches the output portion between a first mode in which it can output multiplexed data and a second mode in which it cannot output the multiplexed data, in synchronism with a sync signal for driving the imager, and switches the input portion between a third mode in which it can input the control data when the output portion is in the second mode, and a fourth mode in which it cannot input the control data when the output portion is in the first mode.

37 Claims, 6 Drawing Sheets

VIDEO CAMERA AND IMAGE INPUT DEVICE CONNECTED THROUGH SIGNAL LINE FOR TRANSFERRING MULTIPLEX DATA, AND IMAGE INPUT SYSTEM USING THEM

BACKGROUND OF THE INVENTION

This invention relates to a video camera, an image input device for inputting image data generated from the video camera, and an image input system using them. More particularly, the invention relates to a video camera, an image input device and an image input system suitable for connection with a television conference apparatus or a computer apparatus equipped with image processing functions.

A system which inputs images obtained by a video camera to a television conference apparatus or a computer having image processing functions has been employed in recent years. Generally, such a system is divided into a video camera portion for imaging images and converting them to electric signals and an image input device portion for converting the image signals taken by the video camera to a data format inside the television conference apparatus or the computer. The camera portion is accommodated in most cases in a casing separate from the main body of the television conference apparatus or the computer main body, and is connected to the image input devices accommodated in the main body through cables, etc. The image data is handled as digital data inside the television conference apparatus or the computer. Image signal processing inside the camera, too, is digitized. In such an apparatus, therefore, the signal transfer by a digital system is more advantageous than an analog system because an analog-to-digital conversion process can be eliminated, a circuit scale can be reduced and image quality can be improved. In recent video camera and image inputting device of this kind, the video camera main body portion and the image input device portion are connected with each other by cables for the digital signals as described, for example, in JP-A-6-276547 and IEEE Transactions on Consumer Electronics, Vol. 39, NO. 3 pp. 467 to 473 August 1993.

In the apparatus or system described above according to the prior art, transfer of the image data between the video camera and the image input device is made by digital signals including a luminance signal and a color difference signal. For this reason, a signal processing circuit such as a color conversion circuit for converting image signals taken by a CCD, or the like, and read out to provide the luminance signal and the color difference signal must be provided at the camera side, and the problem arises that the connection cable becomes thick.

In other words, because the image signals are converted to the luminance signal and the color difference signal in the video camera, signal lines for the luminance signal and for the color difference signal must be prepared when these signals are transferred to the image input device.

SUMMARY OF THE INVENTION

It is an object of the present invention to reduce the circuit size of a video camera for supplying digital image data to a television conference apparatus or a computer having image processing functions, and to reduce the number of signal lines for connecting the image input portion and the video camera.

According to an aspect of the present invention, there is provided a video camera, including an imager and an analog-to-digital (A/D) convertor for converting video signals read out from the imager to digital image data, for applying the digital image data to an image input device for converting the digital image data to a data format used in an external information processing unit, through a signal line, wherein the video camera further comprises an input portion for inputting control data inputted thereto from the image input device through the signal line and producing an output, a control circuit for controlling the operation state of the video camera in accordance with the control data from the input portion, and a mode switching circuit for switching the output portion between a first mode in which it can output multiplex data and a second mode in which it cannot output the multiplex data, and switching the input portion between a third mode in which it can input the control data when the output portion is in the second mode and a fourth mode in which it cannot input the control data when the output portion is in the first mode, in response to a sync signal for driving the imager.

According to another aspect of the present invention, there is provided an image input device for inputting digital image data from a video camera through a signal line connected between the video camera and the image input device and for converting the digital image data to a data format used in an external information processing unit, wherein the image input device comprises an input portion for inputting the digital image data inputted thereto through the signal line and producing an output, a signal processing circuit for processing the digital image data from the input portion and converting the data to a data format used in the information processing unit, a control data generating circuit for generating and outputting control data for controlling the operation of the video camera, an output portion for inputting the control data from the control data generating circuit and producing an output through the signal line, and a mode switching circuit for switching the input portion between a first mode in which it can input the digital image data and a second mode in which it cannot input the control data, and switching the output portion between a third mode in which it can output the control data when the input portion is in the second mode and a fourth mode in which it cannot output the control data when the input portion is in the first mode.

According to the present invention described above, the image signal outputted from the imager (CCD) in the video camera are converted to the digital image data and are outputted in a state in which the components of the image signal remain as such, that is, without color signal conversion (conversion to a luminance signal and a color difference signal). Therefore, this color signal conversion of the digital image data and signal processing are executed on the side of the image input device. In other words, since circuits for color signal conversion, etc., are not necessary in the video camera, the circuit scale can be reduced. When the image data are converted to the luminance signal and the color difference signal in the video camera and these signals are transferred to the image input device, signal lines are separately necessary for the luminance signal and the color difference signal. According to the present invention, on the other hand, the image signal is not converted to the color signals but is as such transferred to the image input device. In comparison with the case where the signal is transferred after color signal conversion, therefore, the number of signal lines between the video camera and the image input device can be reduced by about a half.

According to still another aspect of the present invention, there is provided a video camera including an imager and an analog-to-digital (A/D) convertor for converting video signals read out from the imager to digital image data, for applying the digital image data to an image input device for converting the digital image data to a data format used inside an external information processing unit through a signal line, wherein the video camera further comprises a detecting circuit for detecting the state of the video camera and outputting operation data representing the operation state, a multiplexer for multiplexing the operation data from the detecting circuit and the digital image data from the A/D convertor, an output portion for outputting the multiplexed data from the multiplexer to the first signal line, an input portion for inputting the control data corresponding to the operation state of the video camera and inputted thereto through the first signal line from the image input device and for producing an output, and a control circuit for controlling the operation state of the video camera in accordance with the control data from the input portion.

According to an example of the present invention, the video camera further comprises a mode switching signal generating circuit for generating a first mode switching signal in synchronism with a sync signal used for driving the imager and applying it to the output portion and for the input portion, and generating a second mode switching signal in synchronism with the sync signal and applying it to the multiplexer, wherein the output portion is switched between a first mode in which it can output the multiplexed data and a second mode in which it cannot output the multiplexed data, in response to the first mode switching signal, the input portion is switched between a third mode in which it can input the control data and a fourth mode in which it cannot input the control data in response to the first mode switching signal, the multiplexer is switched between a fifth mode in which it selects and outputs the operation data from the detecting circuits and a sixth mode in which it selects and outputs the digital image data from the A/D convertor in response to the second mode switching signal, the input portion is in the fourth mode when the output portion is in the first mode, the input portion is in the third mode when the output portion is in the second mode, the first input portion is in the third mode during a first period within a blanking period of the digital image data, and the multiplexer is in the fifth mode while the digital image data from the A/D convertor is at least another period within the blanking period other than the first period.

According to an example of the present invention described above, the video camera sends the operation data to the image input device through the signal line in a first period within the blanking period of the digital image data.

The image input device sends the control data to the video camera through the signal line in another period within the blanking period of the digital image data from the video camera.

Accordingly, the data portion of the digital image data, the operation data and the control data can be transferred by time division multiplexing by using the same signal line, and the number of signal lines between the video camera and the image input device can be reduced.

In the present invention, the data other than the image data (i.e., control data, operation data) are transferred during the blanking period. Accordingly, data transfer can be carried out efficiently.

DESCRIPTION OF THE PREFERRED EMBODIMENTS

Hereinafter, a video camera, an image input device and an image input system using video camera and the image input device according to preferred embodiments of the present invention, will be explained in detail with reference to the accompanying drawings.

Figure 1:
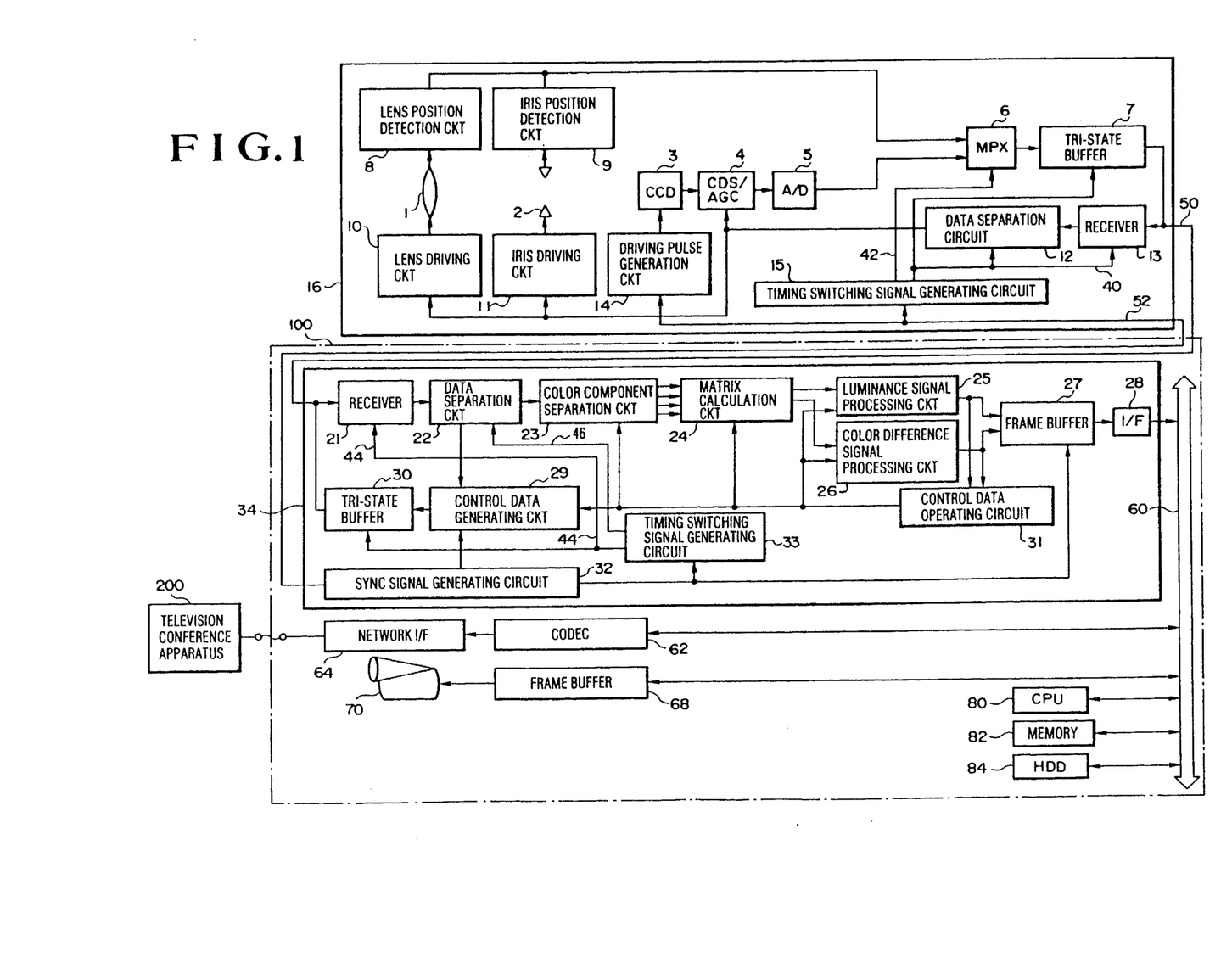
FIG. 1 is a block diagram showing the construction of a video camera, an image input device and an image input system using the video camera and the image input device according to an embodiment of the present invention.

FIG. 1 is a structural view of an image input system including a video camera and an image input device according to the first embodiment of the present invention. The drawing shows an example where the present invention is applied to a television conference apparatus as an example of the image input system. Incidentally, the present invention can be applied not only to the video conference apparatus but also to a system wherein a video camera and a computer including the image input device are disposed in spaced-apart relation by signal lines and the video camera must be compact in size.

In FIG. 1, the video camera 16 is shown connected to the image input device 34 through a signal line 50 for transmitting digital image data from the video camera and control data from the image input device 34, etc., and through a signal line 52 for transmitting a sync signal from the image input device 34.

The image input device 34 is incorporated in a computer 100, and the video camera 16 and the computer 100 together constitute a television conference apparatus. The image input device 34 converts the digital image data from the video camera to a data format used inside an external information processing unit and in this embodiment, the external information processing unit corresponds to the rest of portions obtained by removing the image input device 34 of the computer 100.

In the computer 100, the image data from the image input device 34 is sent to an image compression circuit (coder-decoder: CODEC) 62 through a bus 60, is compressed to a data quantity suitable for transmission, in accordance with the algorithm described in ITU-T H.261 Recommendation, for example, and is then sent to other television conference apparatus 200 through a network interface 64 and a network (LAN, for example) 66. The image data from the image input device 34 is stored in a frame buffer 68 through the bus 60, and the image data read out from this frame buffer is displayed on a monitor display 70. A CPU 80 controls the television conference apparatus as a whole, and control data, control programs, etc., of this CPU 80 are stored in a memory 82 and an external memory (e.g. hard disk driver; HDD) 84.

Next, the television camera 16 will be explained.

The image formed on a charge-coupled device (CCD) 3 from a lens 1 through a iris 2 is outputted as an image signal from the CCD 3. A correlated double sampling processing and automatic gain control are made for this image signal by a correlated double sampling/automatic gain control (CDS/AGC) circuit 4, and the resulting signal is converted to digital image data by an analog-to-digital convertor (A/D) 5. A multiplexer (MPX) 6 effects time division multiplexing of operation data on the focus distance of the lens 1 and the aperture value of the iris 2, which are outputted from a lens position sensor 8 and an aperture value sensor 9 disposed in association with the optical system of the camera, and the digital image data from the A/D convertor 5, and sends this multiplex data to the signal line 50 connected to the image input device 100 through a buffer 7 functioning as a transmission portion or an output portion, such as a tri-state buffer. A data separating circuit 12 receives the control data sent from the image input device 100 via the signal line 50, through a receiver 13 functioning as a receiver or an input portion, and sends it to the CDS/AGC circuit 4 and to an optical system driving circuit such as a focus lens driving circuit 10, an aperture driving circuit 11, etc. A driving pulse generating circuit 14 and a timing (mode) switching signal generating circuit 15 input the sync signals which are sent from the image input device 34 through the signal line 52. The driving pulse generating circuit 14 generates the driving pulse of the CCD3 on the basis for this sync signal and the control data from data separating circuit. The timing (mode) switching signal generating circuit 15 generates a timing (mode) switching signal for the multiplexer 6 and a timing (mode) switching signal for the tri-state buffer 7, the data separating circuit 12 and the receiver 13.

The image input device 34 inputs the image data and the operation data sent from the video camera 16 through the signal line 50 by the receiver 21 which functions as a receiver or an input portion, and sends the data to a data separating circuit 22. The data separating circuit 22 separates the digital image data and the operation data and sends the digital image data to a chroma separating circuit 23 and the operation data to a control circuit 29, such as a microcomputer, for example. The chroma separating circuit 23 separates the signal components contained in the signal outputted from the CCD 3, e.g. green (G), cyan (Cy), Magenta (Mg) and yellow (Yl). A matrix calculating circuit 24 receives these signal components and calculates and determines a luminance signal Y and a color difference component signal C from each of the G, Cy, Mg and Yl, and sends the luminance signal to a luminance signal processing circuit 25 and the color difference component signal to a color difference signal processing circuit 26. The outputs of the luminance signal processing circuit 25 and the color difference processing circuit 26 are stored in a frame buffer 27, are then applied to bus 60 through an interface circuit (I/F) 28, and are thereafter processed by the CODEC 62, etc. A control data operating circuit 31 determines the focus control data, the iris control data and the AGC control data for the video camera 16 and the white balance control data for the image input device 34 from the luminance signal and the color difference signal outputted from the luminance signal processing circuit 25 and the color difference processing circuit 26 and sends these data to a control data generating circuit 29. The control data generating circuit 29 calculates the control data value for each portion of the video camera 16 and the image input device 34 on the basis of the operation data separated by the data separating circuit 22 and various control data from the control data operating circuit 31 described above, sends the control data for the video camera 16 to the video camera 16 through a tri-state buffer 30 functioning as a transmission portion or the output portion, and applies an control data to the chroma separating circuit 23, the matrix calculating circuit 24, the luminance signal processing circuit 25 and the color difference processing circuit 26 in the image input device 34.

Such control data operating circuit 31 and control circuit are described, for example, in U.S. Pat. No. 5,382,974.

A sync signal generating circuit 32 generates sync signals as a reference for the operations of the image input device 34 and the video camera 16, and sends the sync signals so generated to the control circuit 29, the timing switching signal generating circuit 33, the control data operating circuit 31 and the frame buffer 27, and also sends them to the video camera 16 through the signal line 52.

The timing switching signal generating circuit 33 generates a timing (mode) switching signal 44 for switching a mode in which the receiver 21 can input and so receives the data sent from the video camera 16 and a mode in which the tri-state buffer 30 sends the control data to the video camera 16 and so can output the control data, and applies the signal 44 to the receiver 21 and the tri-state buffer 30. The timing switching signal generating circuit 33 further generates a timing (mode) switching signal 46 for switching a mode in which the data separating circuit 22 extracts the digital image data from the data sent from the video camera 16 and a mode a which the circuit 22 extracts the operation data (i.e., a mode in which it can separate and extract the image data) and applies this mode signal to the data separating circuit 22.

Similarly, the timing switching signal generating circuit 15 inside the video camera 16 generates a timing (mode) switching signal 40 for switching a mode in which the receiver 13 can input and so receives the control data sent from the image input device 34, and a mode in which the tri-state buffer 7 can output and so sends the data (digital image data and operation data) to the image input device 34, and applies this mode signal to the receiver 13 and the tri-state buffer 7. This timing (mode) switching signal 40 is further applied to the data separating circuit 12, so that the data separating circuit 12 enters the mode in which it separates the control data sent from the image inputting device 34 into plural pieces of control data for each control circuit (4, 10, 11, 14). Furthermore, the timing switching signal generating circuit 15 generates a timing (mode) switching signal 42 for switching a mode in which the MPX 6 selects and outputs the operation data and a mode in which it selects and outputs the digital image data, and applies this mode signal to the MPX 6.

Figure 2:
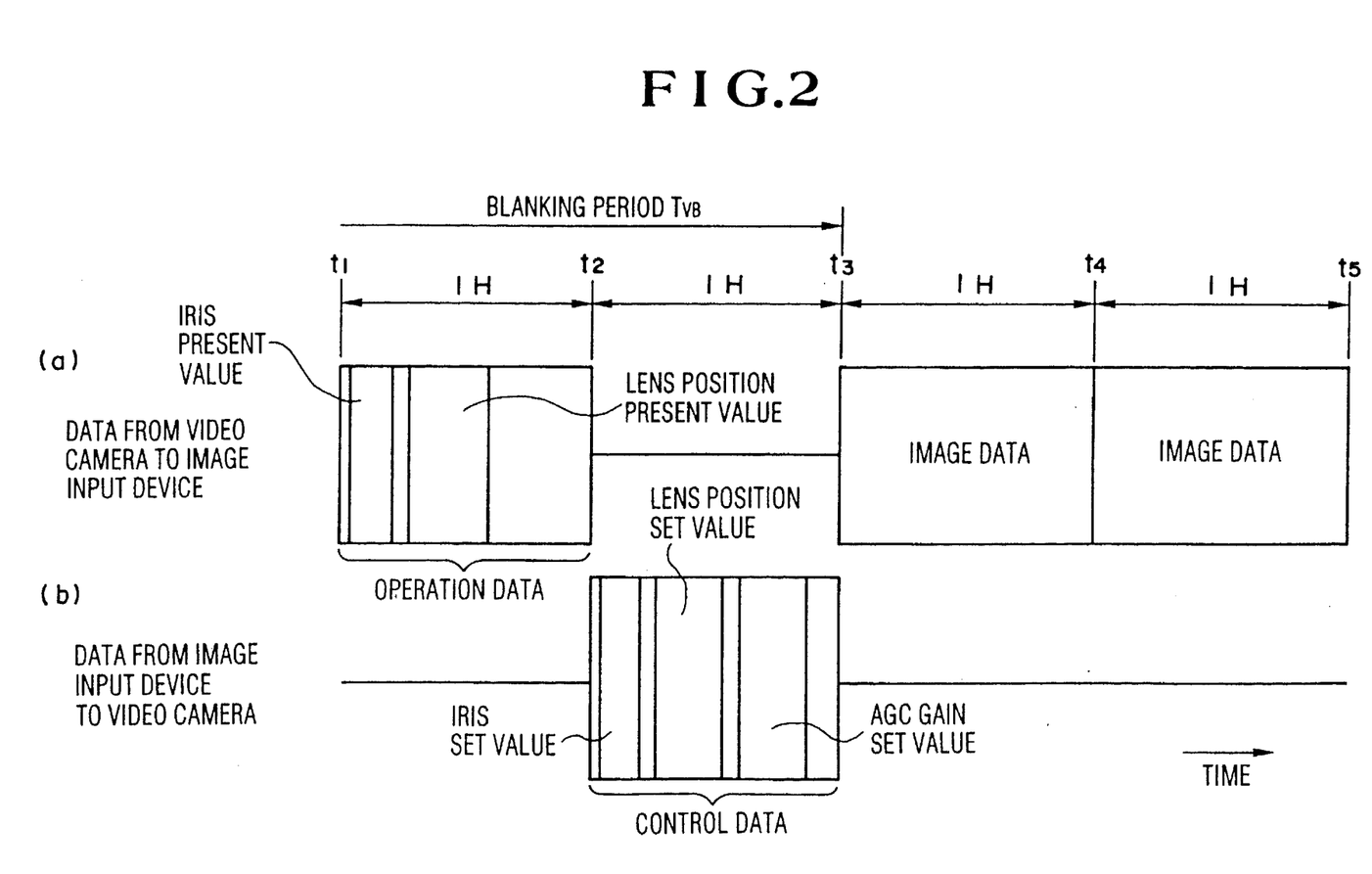
FIG. 2 is a timing chart showing image data, operation data and control data in the image input system shown in FIG. 1.
Figure 3:
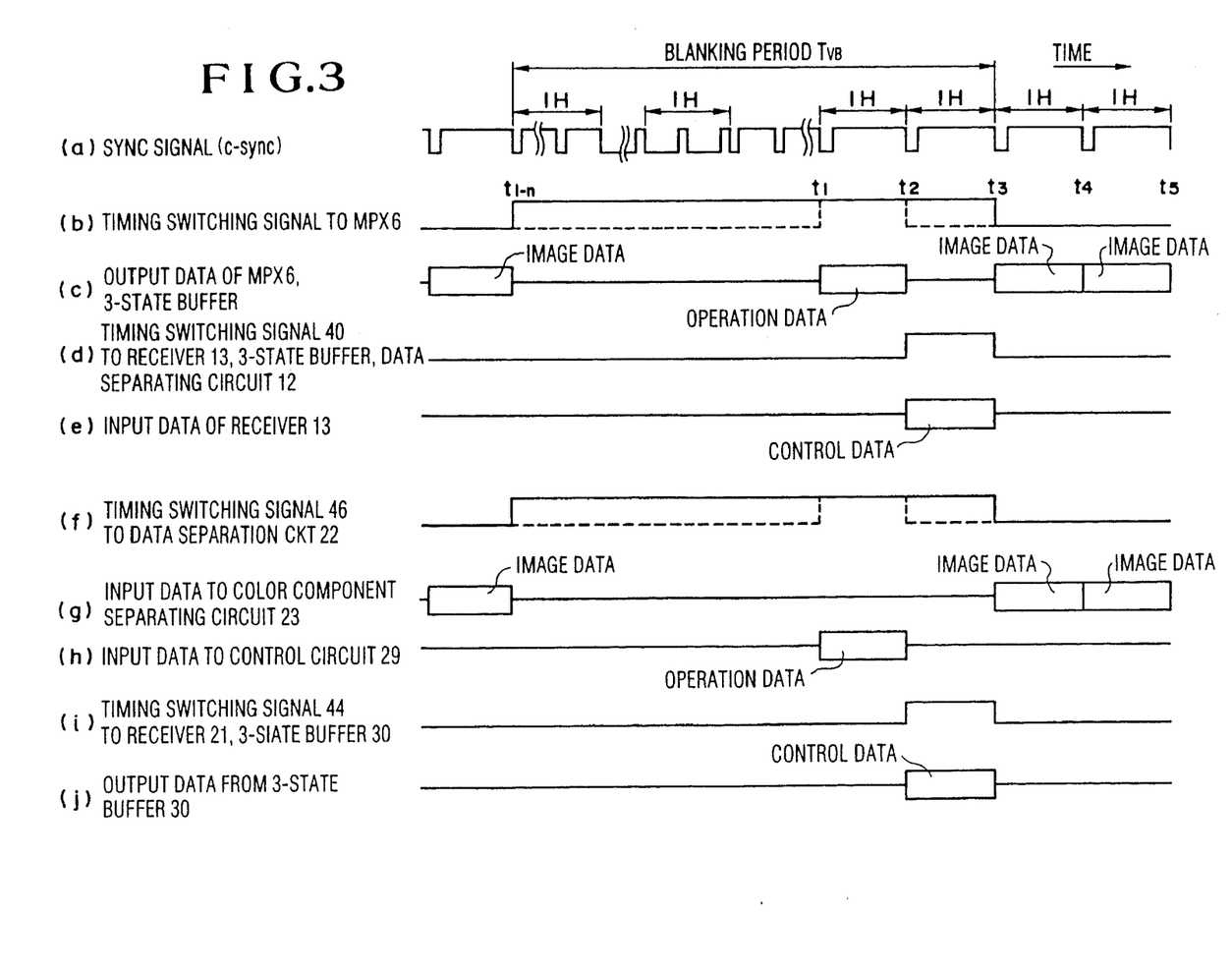
FIG. 3 is a timing chart useful for explaining the operation of the image input system shown in FIG. 1.

FIG. 2 is a timing chart showing the relationship among the image data, the operation data and the control data that are exchanged between the video camera 16 and the image input device 34 in the image input system shown in FIG. 1. FIG. 3 is a timing chart of the signal data at each portion, and is useful for explaining the data exchange between the video camera 16 and the image input device 34.

As shown in FIG. 2(a), the operation data comprises the data representing the present value of the iris and the present value of the lens position, for example, and is outputted from the video camera 16 within a vertical blanking period $T_{VB}$, for example.

As shown in FIG. 2(b), the control data comprises an iris set value, a lens position set value and an AGC gain set value, for example, and is outputted from the image input device 34 during the vertical blanking period, for example.

Next, the flow of the data and the signal at each portion of the image input system shown in FIG. 1 will be explained with reference to FIG. 3.

FIG. 3(a) shows the sync signal (c-sync signal) from the sync signal generating circuit 32, and this embodiment represents the case of the NTSC system. This sync signal contains a vertical blanking period $T_{VB}$ (time t1-n to t3). In the drawing, 1 H represents a horizontal scanning period.

The timing generating circuit 15 in the video camera generates timing (mode) switching signals 40, 42 in synchronism with the sync signal. As shown in FIG. 3(d), the timing (mode) switching signal 40 rises to a high level only for an arbitrary period during the vertical blanking period $T_{VB}$, such as only one horizontal scanning period between the time t2 and t3, for example. As shown in FIG. 3(b), the timing (mode) switching signal 42 rises to the high level only in the vertical blanking period $T_{VB}$, for example. Alternatively, this timing (mode) switching signal 42 may be raised to the high level only during one horizontal scanning period (t1 to t2) within the vertical blanking period $T_{VB}$ different from the period (t2 - t3) described above, for example, as indicated by a dotted line in FIG. 3(b).

In the video camera 16, the receiver 13 and the data separating circuit 12 remain OFF while the timing switching signal 40 is at a low level, where the receiver 13 cannot input while the data separating circuit 12 cannot separate the data, for example, and are turned ON when the signal 40 is at the high level, where the receiver can input and the data separating circuit can separate the data. On the other hand, the tri-state buffer 7 is turned ON (can output) while the timing switching signal 40 is at the low level, for example, and is turned OFF (cannot output) when the latter is at the high level. While the timing switching signal 42 is at the high level, the MPX 6 selects and outputs the operation data and while the signal 42 is at the low level, the MPX 6 selects and outputs the image data. As shown in FIG. 3(c), therefore, the tri-state buffer 7 of the video camera 16 applies the operation data during the time t1 and t2 and the image data during the period after the timing t3 other than the vertical blanking period, to the image input device 34. The control data from the image input device is inputted to the receiver 13 during the period inside the vertical blanking period, in which the operation data is not outputted from the video camera, such as the period t2 to t3, and is then applied to the data separating circuit 12. The data separating circuit 12 separates the control data in synchronism with the rise (ON) of the timing switching signal 40. This data separating circuit 12 can separate and extract the control data for each of the iris set value, the lens position set value and the AGC gain set value by, for example, counting the number of bits of the control data which is inputted after the rise of the timing switching signal 40. Incidentally, each control data may be separated and extracted by generating the timing switching signal applied to the data separating circuit 12 by a plurality of sync signals which are in synchronism with the control data of each of the iris set value, the lens position set value and the AGC gain set value.

On the other hand, the timing generating circuit 33 inside the image input device 34 generates timing (mode) switching signals 44 and 46 in synchronism with the sync signal. The timing (mode) switching signal 44 may be a waveform having the same timing as the timing switching signal 40 as shown in FIG. 3(i), and is raised to the high level only in one horizontal scanning period between the time t2 to t3 during the vertical blanking period $T_{VB}$, for example. The timing (mode) switching signal 46 may be a waveform having the same timing as the timing switching signal 42 as shown in FIG. 3(f), for example, and is raised to the high level during only the vertical blanking period $T_{VB}$, for example. Alternatively, this timing (mode) switching signal 46 may be raised to the high level only during one horizontal scanning period (time t1 to t2) within the vertical blanking period $T_{VB}$, as indicated by a dotted line in FIG. 3(f), for example.

In the image input device 34, while the timing switching signal remains at the low level, the receiver 13 and the data separating circuit 12 are turned ON and they can input and can separate the data, respectively, and when the former is at the high level, the latter are OFF and they cannot input and cannot separate the data, respectively. On the other hand, the tri-state buffer 30 is OFF (cannot output) while the timing switching signal 44 is at the low level, for example, and is turned ON (can output) while the former is at the high level. Accordingly, as shown in FIG. 3(i), the tri-state buffer 30 of the image input device 34 provides the control data to the video camera 16 during the time t2 to t3. The image data and the operation data from the video camera 16 are inputted to the receiver 21 in 1 H period (time t1 to t2) during the vertical blanking period, while the image data is inputted to the receiver 21 during a period other than the vertical blanking period. These data are then applied to the data separating circuit 22. The data separating circuit 22 separates and extracts the operation data while the timing switching signal 46 is at the high level, and applies it to the control data generating circuit 29. The data separating circuit 22 separates and extracts the operation data while the timing switching signal 46 is at the high level, and applies it to the color component separating circuit 23.

Incidentally, this embodiment is so constituted as to transfer the operation data and the control data through the signal line 50 during only the vertical blanking period, but it may also transfer the operation data and the control data during the horizontal blanking period through the signal line 50.

Though the operation data and the control data are transferred during the period t1 to t3 in the embodiment described above, they may be transferred in another period during the vertical blanking period. The operation data and the control data transferred during the vertical blanking period may be transferred for at least 1 H period, respectively.

In this embodiment, the image signal outputted by the CCD in the video camera is converted to the digital data while the components of the image signal remain as such or in other words, without color signal conversion (conversion to the luminance signal and the color difference signal). Accordingly, the image input device executes color signal conversion of this digital image data and signal processing. In other words, because a circuit for color signal conversion, etc., becomes unnecessary in the video camera, the scale of the circuit can be reduced. When the image data is converted to the luminance signal in the video camera and the color difference signal and these signals are transferred to the image input device, separate signal lines become necessary for the luminance signal and the color difference signal. In comparison with such a case, this embodiment can reduce the number of necessary signal lines by about a half.

The digital image data, the operation data representing the operation state of the video camera and the control data for controlling the operation of each portion of the video camera can be multiplexed and transferred on the signal lines connecting the video camera and the image input device. Accordingly, this embodiment can prevent an increase in the number of signal lines for the control operation.

Particularly, in the present invention, the data (control data and operation data) other than the image data are transferred during the blanking period. Therefore, the data can be efficiently transmitted.

Figure 4:
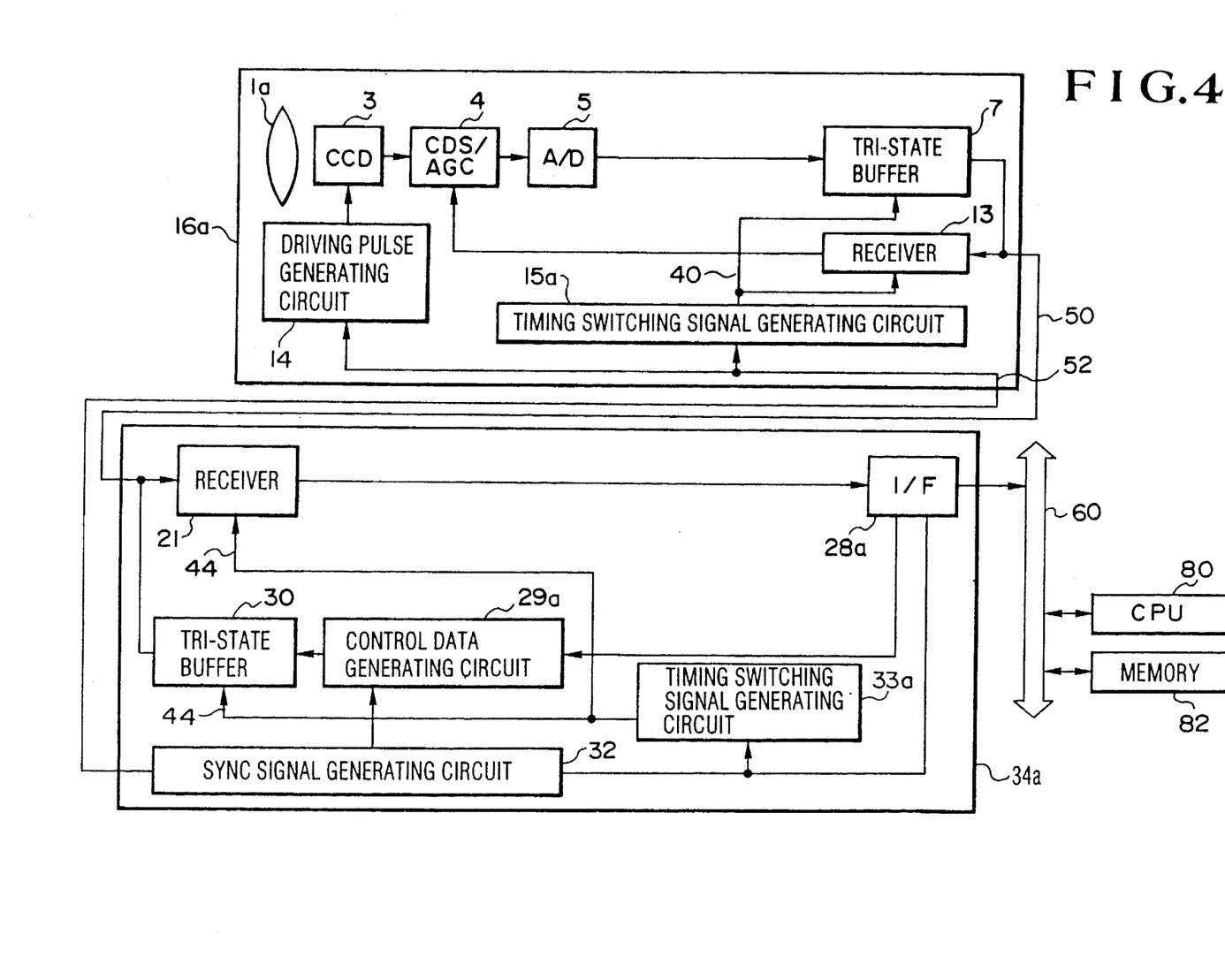
FIG. 4 is a block diagram showing the construction of another embodiment of the present invention.

FIG. 4 is a block diagram showing the construction of another embodiment of the present invention. In the drawing, like reference numerals will be used to identify like constituents as in FIG. 1, and the explanation will be omitted. In the video camera 16a according to this embodiment, a lens having a fixed focal length is used as the lens 1a, and exposure control is carried out solely by shutter timing control of the CCD 3 by the driving pulse generating circuit 14 without using the iris. Accordingly, the lens position detecting circuit 8 and the iris position detecting circuit 9 shown in FIG. 1 become unnecessary, and because the operation data to be transmitted from the video camera 16a to the image input device 34 does not exist, the timing switching signal generating circuit 15a generates only the timing (mode) switching signal 40 for the tri-state buffer 7 and the receiver 13. The construction and operation of the rest of portions are the same as those of the video camera 16 shown in FIG. 1.

In the video camera 16a shown in FIG. 4, too, separation of the color signals and processing of luminance and color difference signals are effected on the side of the image input device. Therefore, the circuit scale of the video camera portion can be reduced. Since the digital image data and the control data are processed by time division multiplexing, the number of signals connecting the video camera 16a to the image input device can be reduced, too.

In the image input device 34a of this embodiment, the timing switching signal generating circuit 33a generates a timing (mode) switching signal 44 for switching a mode, in which the receiver 21 receives the digital image data from the video camera 16a, and a mode, in which the tri-state buffer 30 sends the control data generated by the control circuit 29a of the image input device 34a, in synchronism with the timing switching signal 40 on the video camera side.

In other words, the waveforms of these timing switching signals 40 and 44 may be the same as those of FIG. 3.

The digital image data arriving from the video camera 16a is sent from the receiver 21 to the interface circuit 28a and is further outputted to a data processing portion such as the computer shown in FIG. 1. Processing of the digital image data, comprising the color components of G, Cy, Mg and Yl read out from the CCD 3 of the video camera 16a, is executed software-wise by the CPU 80 of the computer, for example, the data and are converted to the signal format required by such a computer. Similarly, the computer calculates the control data necessary for the control of the video camera from the digital image data and sends it to the control data generating circuit 29a through the interface circuit 28a. Furthermore, the control data generating circuit 29a delivers this control data as the control data to be sent to the video camera 16a, from the tri-state buffer 30.

Figure 5:
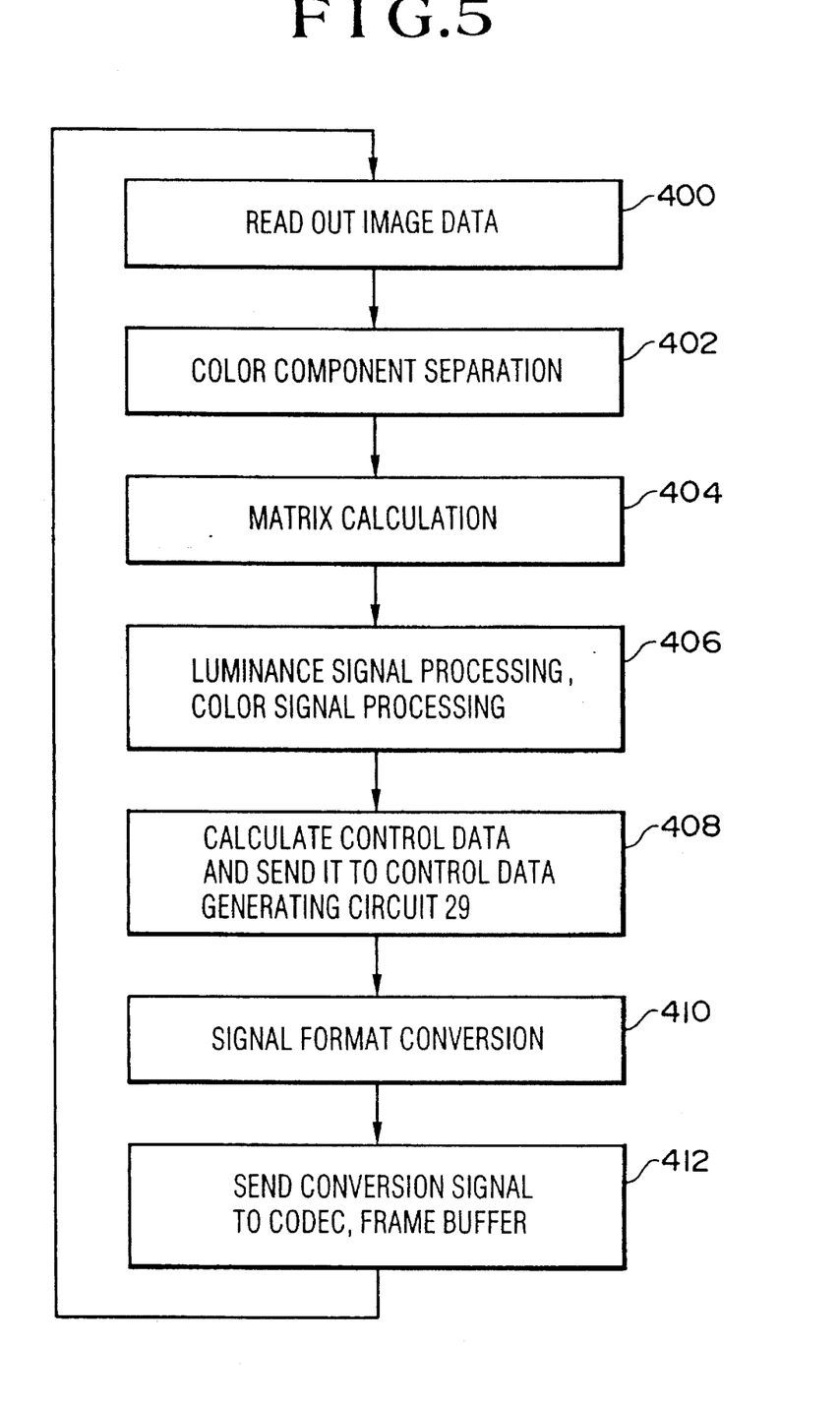
FIG. 5 is a flowchart useful for explaining software processing of digital image data in the embodiment shown in FIG. 4.

FIG. 5 is a flowchart showing an example of the processing of the image data executed by this CPU 80. The image data from the interface 28a is once stored in the memory 82 in the image data unit for 1 H period, for example, through the bus 60, and is executed by the CPU 80.

First, the image data for 1 H period, for example, stored in the memory 82 is read out in step 400.

The color components of the image data so read out are separated in step 402 (processing is similar to that of the color component separating circuit 23 shown in FIG. 1), and matrix operation processing is done on the basis of the color components so separated (G, Cy, Mg, Yl) in step 404 so as to determine the luminance signal and the color difference component signal (processing is similar to the matrix calculating circuit 24). The luminance signal and the color difference component signal so obtained are processed in step 406 (processing is similar to the luminance signal processing circuit 25 and the color difference processing circuit 26, e.g. noise processing, image quality regulation, white balance regulation, etc.). Next, in step 408, the control data is calculated on the basis of the luminance signal and the color difference signal after signal processing (processing is similar to the control data operating circuit 31), and the result of the operation is sent to the control data generating circuit 29a through the interface 28a. The control data generating circuit 29a generates the control data on the basis of the result of the operation.

Next, at the step 410, the signal formats of the luminance signal and the color difference signal after signal processing are converted, and the signals in the converted formats are stored in the CODEC 62 and the frame buffer 68 (see FIG. 1; step 412). Processing is then executed similarly for the image data of the next 1 H period.

As described above, the image input device 34a shown in FIG. 4 can receive the digital image data obtained by converting as such the components of the image signal read out from the CCD3 in the video camera 16a. Therefore, the circuit scale of the video camera portion can be reduced, and the number of signal lines for transmitting the image data can be reduced, as well. Since the digital image data and the control data for controlling the operation of the video camera can be transmitted by using an same signal line, the increase of the number of signal lines for the control operation can be prevented. Further, because the digital image data inputted from the video camera 16a can be processed software-wise by the CPU on the computer side to which the image input device 34a is connected, the hardware cost of the overall system can be reduced.

In the image input device 34a of this embodiment, data processing of the image data and the operation processing of the control data are done by software processing, but hardware processing may be executed by using the same construction as the image input device 34 shown in FIG. 1. In this case, however, the data separating circuit 22 shown in FIG. 1 is not necessary.

Figure 6:
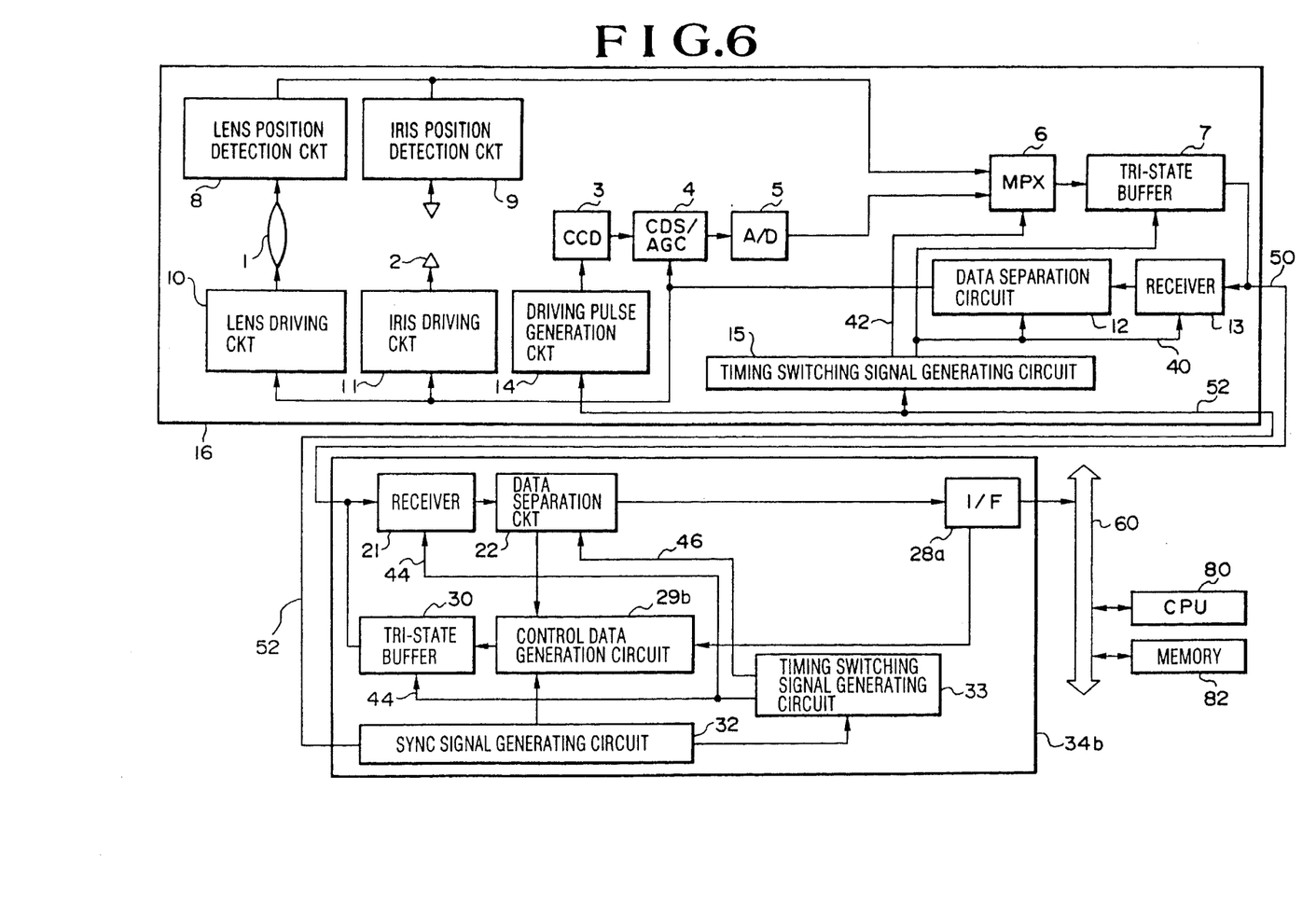
FIG. 6 is a block diagram showing the construction of still another embodiment of the present invention.

FIG. 6 shows still another embodiment of the present invention. The construction of the television camera 16 is the same as that of FIG. 1, and data processing of the image data and operation processing of the control data are executed by software processing in the same way as in the embodiment shown in FIG. 4. Incidentally, like reference numerals will be used in this embodiment, to identify like constituents in the same way as in FIGS. 1 and 4.

In the image input device 34b of this embodiment, a data separating circuit 22 is further added to the image input device 34a shown in FIG. 4 and the image data and the operation data from the receiver 21 may be separated and extracted in synchronism with the timing switching signal 46 from the timing (mode) switching signal generating circuit 33. This embodiment, too, provides the same effect as the embodiment shown in FIG. 4.

The operations of the control data generating circuits 29a, 29b shown in FIGS. 4 and 6 can be executed by the CPU 80 of the computer, etc., connected to the image input device 34a, 34b. In this case, the control data are directly transferred to the video camera through the tri-state buffer from the interface circuit 28a by omitting the control data generating circuit 29a, 29b. In this case, too, the effects described above are not at all deteriorated.

According to the present invention, the digital image data obtained by digitally converting as such color components from the signal read out by the CCD of the video camera can be transferred to the image input device from the video camera. Accordingly, the image processing circuit for color signal conversion processing need not be disposed inside the video camera, and a reduction of the size and the cost of production can be accomplished by the reduction of the number of components of the video camera. The number of signal lines for transferring the digital image data may be smaller than when using the luminance signal and the color difference signal, and the signal for controlling the operation of the video camera, too, is transferred by the same signal line. Accordingly, an increase of the signal lines connecting the video camera to the image inputting device can be prevented.

What is claimed is:

1. An image input system comprising a video camera, first and second signal lines, and an image input device connected to said video camera by said first and second signal lines, said video camera including an imager and an analog-to-digital (A/D) convertor for converting video signals read out from said imager to digital image data, for outputting the digital image data to said first signal line, said image input device converting the digital image data from said first signal line to a data format used inside an external information processing unit, wherein said video camera further comprises:

detecting circuits for detecting a plurality of operation states of said video camera, and for outputting operation state data representing a plurality of the operation states;

a multiplexer for multiplexing the operation state data from said detecting circuits and the digital image data from said A/D convertor, and for outputting multiplexed data;

a first output portion for outputting the multiplexed data from said multiplexer to said first signal line;

a first input portion for inputting a plurality of kinds of control data inputted thereto from said image input device through said first signal line, and for producing an output;

a first data separating circuit for separating and outputting a plurality of kinds of the control data from said first input portion;

control circuits for controlling a plurality of kinds of the operation states of said video camera in accordance with a plurality of kinds of separated control data from said first data separating circuit, respectively; and a first mode switching signal generating circuit for generating a first mode switching signal in synchronism with a sync signal inputted from said image input device through said second signal line, applying the first mode switching signal to said first output portion, said first input portion and said control data separating circuit, generating a second mode switching signal in synchronism with the sync signal, and applying the second mode switching signal to said multiplexer;

wherein:

said first output portion is switched between a first mode in which said first output portion can output the multiplexed data and a second mode in which said first output portion cannot output the multiplexed data, in response to the first mode switching signal;

said first input portion is switched between a third mode in which said first input portion can input a plurality of kinds of the control data and a fourth mode in which said first input portion cannot input she control data, in response to the first mode switching signal;

said first data separating circuit is switched between a fifth mode in which said first data separating circuit can separate a plurality of kinds of she control data and a sixth mode in which said first data separating circuit cannot separate the control data, in response to the first mode switching signal;

said multiplexer is switched between a seventh mode in which said multiplexer selects and outputs the operation data from said detecting circuits and an eighth mode in which said multiplexer selects and outputs the digital image data from said A/D convertor, in response to the second mode switching signal;

said first input portion is in the fourth mode when said first output portion and said first data separating circuit are in the first and fifth modes, respectively; and said first input portion is in the third mode when said first output portion and said first data separating circuit are in the second and sixth modes, respectively; and wherein said image input device includes:

a second input portion for inputting the multiplexed data inputted thereto through said first signal line, and for producing an output;

a second data separating circuit for separating the multiplexed data from said second input portion into the digital image data and the operation data, and for outputting the separated data;

signal processing circuits for processing the digital image data from said second data separating circuit and converting the digital image data into a data format used in the external information processing unit;

a control data generating circuit for generating and outputting a plurality of kinds of the control data on the basis of the operation data from said data separating circuit;

a second output portion for inputting a plurality of kinds of the control data from said control data generating circuit and producing an output to said first signal line;

a sync signal generating circuit for generating the sync signal; and a second mode switching signal generating circuit for generating a third mode switching signal, synchronized with the first mode switching signal, in synchronism with the sync signal, applying the third mode switching signal to said second output portion and said second input portion, generating a fourth mode switching signal, synchronized with the second mode switching signal, in synchronism with the sync signal and applying the fourth mode switching signal to said second data separating circuit;

wherein:

said second input portion is switched between a ninth mode in which said second input portion can input the multiplexed data and a tenth mode in which said second input portion cannot input the multiplexed data, in response to the third mode switching signal;

said second output portion is switched between an eleventh mode in which said second output portion can output a plurality of kinds of the control data and a twelfth mode in which said second output portion cannot output the control data, in response to the third mode switching signal;

said second data separating circuit is switched between a thirteenth mode in which said second data separating circuit can separate the operation data from the multiplexed data and a fourteenth mode in which said second data separating circuit can separate the digital image data, in response to the fourth mode switching signal;

said second input portion is in the tenth and ninth modes when the second output portion is in the eleventh and twelfth modes, respectively; and said second input portion is in the ninth and tenth modes when said first output portion is in the first and second modes, respectively.

2. An image input system according to claim 1, wherein said first mode switching signal generating circuit generates the first mode switching signal for bringing said first input portion into the third mode while the digital image data from said A/D convertor exist in a first period within a blanking period, and generates the second mode switching signal for bringing said multiplexer into the seventh mode when the digital image data from said A/D convertor exist at least during another period within the blanking period, other than the first period.

3. An image input system according to claim 1, wherein said second mode switching signal generating circuit generates the third mode switching signal for bringing said second output portion into the eleventh mode while the digital image data from said A/D convertor exist in a first period within a blanking period, and generates the fourth mode switching signal for bringing said second data separating circuit into the thirteenth mode whole the digital image data from said A/D convertor exist in at least another period during the blanking period, other than the first period.

4. An image input system comprising a video camera, a first signal line, and an image input device connected to said video camera by said first signal line, said video camera including an imager and an analog-to-digital (A/D) convertor for converting video signals read out from said imager to digital image data, for outputting the digital image data to said first signal line, said image input device converting the digital image data from said first signal line to a data format used inside an external information processing unit, wherein said video camera further comprises:

a detecting circuit for detecting plural pieces of operation states of said video camera, and for outputting operation data representing the plural pieces of operation states;

a multiplexer for multiplexing the operation data from said detecting circuit and the digital image data from said A/D convertor, and for outputting multiplexed data;

a first output portion for outputting the multiplexed data from said multiplexer to said first signal line;

a first input portion for inputting control data inputted thereto from said image input device through said first signal line, and for producing an output; and control circuits for controlling the operation states of said video camera in accordance with the control data from said first input portion; wherein said image input device includes:

a second input portion for inputting the multiplexed data inputted thereto through said first signal line, and for producing an output;

a data separating circuit for separating the multiplexed data from said second input portion into the digital image data and the operation data, and for outputting the separated data;

signal processing circuits for processing the digital image data from said data separating circuit and converting the digital image data into a data format used in the external information processing unit;

a control data generating circuit for generating and outputting the control data on the basis of the operation data from said data separating circuit; and a second output portion for inputting the control data from said control data generating circuit and producing an output to said first signal line.

5. An image input system according to claim 4, wherein said video camera further includes a first mode switching circuit for switching:

said first output portion between a first mode in which said first output portion can output the multiplexed data and a second mode in which said first output portion cannot output the multiplexed data:

said first input portion between a third mode in which said first input portion can input the control data when said first output portion is in the second mode, and a fourth mode in which said first input portion cannot input the control data when said first output portion is in the first mode; and said multiplexer between a fifth mode in which said multiplexer selects and outputs the operation data from said detecting circuits and a sixth mode in which said multiplexer selects and outputs the digital image data from said A/D convertor; and wherein said image input device further includes a second mode switching circuit which switches:

said second input portion between a seventh mode in which said second input portion can input the multiplexed data and an eighth mode in which the multiplexer cannot input the multiplexed data;

said second output portion between a ninth mode in which said second output portion can output the control data when said second input portion is in the eighth mode and a tenth mode in which said second output portion cannot output the control data when said second input portion is in the eighth mode;

and said data separating circuit between the ninth mode in which said data separating circuit can separate the operation data from the multiplexed data and an eleventh mode in which said data separating circuit cannot separate the digital image data.

6. An image input system according to claim 5, wherein said first mode switching circuit switches said multiplexer between the fifth and sixth mode when said first output portion is in the first mode and brings said first input portion into the third mode when said second output portion is in the ninth mode.

7. An image input system according to claim 4, further comprising a second signal line connecting said video camera at said image input device; wherein said video camera further includes:

a first mode switching signal generating circuit for generating a first mode switching signal in synchronism with a sync signal used for driving said imager and inputted from said image input device through said second signal line, applying the first mode switching signal to said first output portion and said first input portion, generating a second mode switching signal in synchronism with the sync signal, and applying the second mode switching signal to said multiplexer;

wherein said image input device further includes:

a sync signal generating circuit for generating the sync signal; and a second mode switching signal generating circuit for generating a third mode switching signal, synchronized with the first mode switching signal in synchronism with the sync signal, applying the third mode switching signal to said second output portion and said second input portion, generating a fourth mode switching signal, synchronized with the second mode switching signal, in synchronism with the sync signal, and applying the fourth mode switching signal to said data separating circuit;

wherein:

said first output portion is switched between a first mode in which said first output portion can output the multiplexed data and a second mode in which said first output portion cannot output the multiplexed data, in response to the first mode switching signal;

said first input portion is switched between a third mode in which said first input portion can input the control data and a fourth mode in which said first input portion cannot input the control data, in response to the first mode switching signal;

said multiplexer is switched between a fifth mode in which said multiplexer selects and outputs the operation data from said detecting circuits and a sixth mode in which said multiplexer selects and outputs the digital image data from said A/D convertor, in response to the second mode switching signal;

said first input portion is in the fourth mode when said first output portion is in the first mode;

said first input portion is in the third mode when said first output portion is in the second mode;

said first input portion is in the third mode during a first period in a blanking period of the digital image data;

said multiplexer is in the fifth mode while the digital image data from said A/D convertor exist at least during another period within the blanking period other than the first period; and wherein:

said second input portion is switched between a seventh mode in which said second input portion can input the multiplexed data and an eighth mode in which said second input portion cannot input the multiplexed data, in response to the third mode switching signal;

said second output portion is switched between a ninth mode in which said second output portion can output the control data and a tenth mode in which said second output portion cannot output the control data, in response to the third mode switching signal;

said data separating circuit is switched between an eleventh mode in which said data separating circuit can separate the operation data and a twelfth mode in which said data separating circuit can separate the digital image data, in response to the fourth mode switching signal;

said second input portion is in the eighth and seventh modes when said second output portion is in the ninth and tenth modes, respectively;

said second input portion is in the seventh and eighth modes when the first output portion is in the first and second modes, respectively;

said second output portion is in the ninth mode during the first period within the blanking period of the digital image data; and said data separating circuit is in the eleventh mode during the other period within the blanking period.

8. An image input system according to claim 4, wherein said control data generating circuit of said image input device generates plural pieces of control data as the control data on the basis of the operation data from said data separating circuit, said video camera further includes a control data separating circuit for separating the plural pieces of control data from said first input portion and applying them to said control circuits, said video camera has plural pieces of operation states as the operation states, and said control circuits control the plural pieces of operation states of said video camera in accordance with plural pieces of control data separated by said control data separating circuit, respectively.

9. An image input system according to claim 8, wherein the plural pieces of operation states include the position of a lens and the position of an iris of an optical system of said video camera, said detecting circuits detect the position of said lens and the position of said iris and output data representing the position of said lens and the position of said iris as the operation data, and said control circuit controls the position of said lens and the position of said iris in accordance with plural pieces of control data so separated by said control data separating circuit.

10. An image input system comprising a video camera, a first signal line, and an image input device connected to said video camera by said first signal line, said video camera including an imager and an analog-to-digital (A/D) convertor for converting video signals read out from said imager to digital image data, for outputting the digital image data to said first signal line, said image input device converting the digital image data from said first signal line to a data format used in an external information processing unit, wherein said video camera further comprises:

a first output portion for outputting the digital image data from said A/D convertor to said first signal line;

a first input portion for inputting control data inputted from said image input device through said first signal line, and for producing an output;

control circuits for controlling the operation states of said video camera in accordance with the control data from said first input portion; and a first mode switching circuit for switching said first output portion between a first mode in which said first output portion can output the digital image data and a second mode in which said first output portion cannot output the digital image data, and for switching said first input portion between a third mode in which said first input portion can input the control data when said first output portion is in the second mode, and a fourth mode in which said first input portion cannot input the control data when said first output portion is in the first mode; and wherein said image input device further includes:

a second input portion for inputting the digital image data inputted thereto through said signal line, and for producing an output;

signal processing circuits for processing the digital image data from said second input portion and converting the digital image data to a data format used in the external information processing unit;

a control data generating circuit for generating and outputting the control data;

a second output portion for inputting the control data from said control data generating circuit and outputting the control data to said first signal line; and a second mode switching circuit for switching said second input portion between a fifth mode in which said second input portion can input the digital image data and a sixth mode in which said second input portion cannot input the digital image data, and for switching said second output portion between a seventh mode in which said second output portion can output the control data when said second input portion is in the sixth mode and an eighth mode in which said second output portion cannot output the control data when said second input portion is in the sixth mode.

11. An image input system according to claim 10, wherein said first mode switching circuit switches said first output portion to the first mode when said second input portion is in the fifth mode, and switches said first input portion to the third mode when said second output portion is in the seventh mode.

12. An image input system according to claim 10, wherein said video camera further includes detecting circuits for detecting the operation states of said video camera and for outputting operation data representing the detected operation states; and a multiplexer for multiplexing the operation data from said detecting circuits and the digital image data from said A/D converter, and for outputting multiplexed data to said first output portion;

wherein said first output portion outputs the multiplexed data from said multiplexer to said first signal line;

wherein said image input device further includes a data separating circuit for separating the multiplexed data inputted to said second input portion through said first signal line into the digital image data and the operation data, and for outputting the separated data; and wherein said signal processing circuit processes the digital image data from said data separating circuit and converts the processed data to a data format used inside the external information processing unit, and said control data generating circuit generates and outputs the control data on the basis of the operation data from said data separating circuit.

13. An image input system according to claim 12, wherein said first mode switching circuit further switches said multiplexer between a ninth mode in which said multiplexer selects and outputs the operation data from said detecting circuit and a tenth mode in which said multiplexer selects and outputs the digital image data from said A/D convertor.

14. An image input system according to claim 13, wherein said first mode switching circuit switches said first output portion between the first and second modes in synchronism with a sync signal used for driving said imager, generates a first mode switching signal for switching said first input portion between the third and fourth modes, applies the first mode switching signal to said first output portion and said first input portion, generates a second mode switching signal for switching said multiplexer between the ninth and tenth modes in synchronism with the sync signal, applies the second mode switching signal to said multiplexer, and sets the second, third and ninth modes within a blanking period of the sync signal;

wherein:

said first input portion is set to the third mode during a first period within the blanking period of the digital image data;

said multiplexer is set to the ninth mode at least during another period within the blanking period, other than the first period, while the digital data image from said A/D convertor exist within the blanking period;

said second mode switching circuit switches said second input portion between the fifth and sixth modes in synchronism with the sync signal, and applies a third mode switching signal for switching said second output portion between the seventh and eighth modes to said second input portion and to said second output portion, and the seventh mode is set within the blanking period of the sync signal; and wherein said second output portion is set to the seventh mode during the first period within the blanking period of the digital image data.

15. An image input system according to claim 12, wherein said control data generating circuit of said image input device generates and outputs plural pieces of control data as the control data on the basis of the operation data from said data separating circuit, said video camera further includes a control data separating circuit for separating the plural pieces of control data from said first input portion and applying the separated pieces of control data to said control circuits, said video camera has plural pieces of operation states as the operation states, and said control circuits control the plural pieces of control data of said video camera in accordance with the plural pieces of control data separated by said control data separating circuit, respectively.

16. An image input system according to claim 15, wherein the plural pieces of operation states include the position of a lens and the position of an iris of an optical system of said video camera, said detecting circuits detect the position of said lens and the position of said iris and output data representing the position of said lens and the position of said iris as the operation data, and said control circuits control the position of said lens and the position of said iris in accordance with the plural pieces of control data separated by said control data separating circuit.

17. An image input system according to claim 10, wherein said imager is a charge-coupled device, and said control circuit includes a circuit connected between said imager and said A/D convertor and effecting co-related double sampling processing and automatic gain control for the output of said imager in accordance with the control data.

18. A video camera comprising:

an imager;

an analog-to-digital (A/D) convertor for converting video signals read out from said imager to digital image data, for applying the digital image data through a signal line to an image input device for converting the digital image data to a data format used in an external information processing unit;

detecting circuits for detecting the operation state of said video camera and outputting operation data representing the detected operation state;

a multiplexer for multiplexing the operation data from said detecting circuit and the digital image data from said A/D convertor and outputting multiplexed data;

an output portion for outputting the multiplexed data from said multiplexer to said first signal line;

an input portion for inputting control data corresponding to the operation state of said video camera and inputted thereto from the image input device through the first signal line, and for producing an output; and control circuits for controlling the operation state of said video camera in accordance with the control data outputted from said input portion.

19. A video camera according to claim 18, further comprising a mode switching circuit for switching said output portion between a first mode in which said output portion can output the multiplexed data and a second mode in which said output portion cannot output the multiplexed data, for switching said input portion between a third mode in which said input portion can input the control data when said output portion is in the second mode, and a fourth mode in which said input portion cannot input the control data when said output portion is in the first mode, and for switching said multiplexer between a fifth mode in which said multiplexer selects and outputs the operation data from said detecting circuits and a sixth mode in which said multiplexer selects and outputs the digital image data from said A/D convertor.

20. A video camera according to claim 18, further comprising a mode switching signal generating circuit for generating a first mode switching signal in synchronism with a sync signal used for driving said imager and applying the first mode switching signal to said output portion and said input portion, and for generating a second mode switching signal in synchronism with the sync signal and applying the second mode switching signal to said multiplexer, and wherein:

said output portion is switched between a first mode in which said output portion can output the multiplexed data and a second mode in which said output portion cannot output the multiplexed data, in response to the first mode switching signal;

said input portion is switched between a third mode in which said input portion can input the control data and a fourth mode in which said input portion cannot input the control data, in response to the first mode switching signal;

said multiplexer is switched between a fifth mode in which said multiplexer selects and outputs the operation data from said detecting circuit and a sixth mode in which said multiplexer selects and outputs the digital image data from said A/D convertor, in response to said second mode switching signal;

said input portion is in the fourth mode when said output portion is in the first mode;

said input portion is in the third mode when said output portion is in the second mode;

said first input portion is in the third mode during a first period within a blanking period of the digital image data; and said multiplexer is in the fifth mode when the digital image data from said A/D convertor exists at least during another period within the blanking period, other than the first period.

21. A video camera according to claim 18, wherein said input portion inputs plural pieces of control data as the control data from said image input device through the signal line, said video camera further includes a control data separating circuit for separating the plural pieces of control data from said input portion and applying the separated pieces of control data to said control circuits, said video camera has plural pieces of operation states as the operation states, and said control circuits control the plural pieces of operation states of said video camera in accordance with the plural pieces of control data separated by said control data separating circuit.

22. A video camera according to claim 21, wherein the plural pieces of operation states include the position of a lens and the position of an iris of an optical system of said video camera, said detecting circuits detect the position of said lens and the position of said iris and output data representing the positions of said lens and said iris so detected as the operation data, and said control circuits control the positions of said lens and said iris in accordance with the plural pieces of control data separated by said control data separating circuit.

23. An image input device for inputting multiplexed data of digital image data shot by a video camera and operation data representing operation states of the video camera from the video camera through a signal line, and converting the digital image data to a data format used in an external information processing unit, said image input device comprising:

an input portion for inputting the multiplexed data inputted thereto through the signal line, and for producing an output;

a data separating circuit for separating the multiplexed data from said input portion into the digital image data and the operation data, and for outputting the separated data;

signal processing circuits for processing the digital image data from said data separating circuit and converting the processed data to a data format used in the external information processing unit;

a control data generating circuit for generating and outputting control data for controlling the operation states of the video camera on the basis of the operation data from said data separating circuit: and an output portion for inputting the control data from said control data generating circuit and outputting the control data to the video camera through said signal line.

24. An image input device according to claim 23, further comprising a mode switching circuit for switching:

said input portion between a first mode in which said input portion can input the multiplexed data and a second mode in which said input portion cannot input the multiplexed data;

said output portion between a third mode in which said output portion can output the control data when said input portion is in the second mode and a fourth mode in which said output portion cannot output the control data when said input portion is in the first mode; and said data separating circuit between a fifth mode in which said data separating circuit can separate the operation data from the multiplexed data and a sixth mode in which said data separating circuit can separate the digital image data from the multiplexed data.

25. An image input device according to claim 23, further comprising:

a sync signal generating circuit for generating a sync signal for driving said video camera; and a mode switching signal generating circuit for generating a first mode switching signal synchronism with the sync signal, applying the first mode switching signal to said output portion and said input portion, generating a second mode switching signal in synchronism with the sync signal, and applying the second mode switching signal to said separating circuit, and wherein:

said input portion is switched between a first mode in which said input portion can input the multiplexed data and a second mode in which said input portion cannot input the multiplexed data, in response to the first mode switching signal;

said output portion is switched between a third mode in which said output portion can output the control data and a fourth mode in which said output portion cannot output the control data, in response to the first mode switching signal;

said data separating circuit is switched between a fifth mode in which said data separating circuit can separate the operation data from the multiplexed data and a sixth mode in which said data separating circuit can separate the digital image data from the multiplexed data;

said input portion is in the second and first modes when said output portion is in the third and fourth modes, respectively;

said output portion is in the third mode during a first period within a blanking period of the digital image data; and said data separating circuit is in the fifth mode at least during another period within the blanking period, other than the first period.

26. A video camera comprising:

an imager;

an analog-to-digital (A/D) convertor for converting video signals read out from said imager to digital image data, and for applying the digital image data through a signal line to an image inputting device for converting the digital image data to a data format used in an external information processing unit; an input portion for inputting control data inputted thereto from the image inputting device through the signal line, and for producing an output;

control circuits for controlling the operation states of said video camera in accordance with the control data from said input portion;

an output portion for outputting the digital image data from said A/D converter to the signal line; and a mode switching circuit for switching said output portion between a first model in which said output portion can output the digital image data, and a second model in which said output portion cannot output the digital image data, in synchronism with a sync signal for driving said imager, and for switching said input portion between a third mode in which said input portion can input the control data when said output portion is in the second mode, and a fourth mode in which said input portion cannot input the control data when said output portion is in the first mode.

27. A video camera according to claim 26, further comprising detecting circuits for detecting the operation states of said video camera and outputting operation data representing the operation states, and a multiplexer for multiplexing the operation data from said detection circuit and the digital image data from said A/D convertor, and for outputting multiplexed data to said output portion, and wherein:

said output portion outputs the multiplexed data from said multiplexer to the signal line; and said input portion inputs the control data corresponding to the operation data through the signal line.

28. A video camera according to claim 27, wherein said mode switching circuit switches said multiplexer between a fifth mode in which said multiplexer selects and outputs the operation data from said detecting circuit-and a sixth mode in which said multiplexer selects and outputs the digital image data from said A/D convertor.

29. A video camera according to claim 28, wherein said mode switching circuit generates a first mode switching signal for switching said output portion between the first and second modes and said input portion between the third and fourth modes in response to the sync signal, applies the first mode switching signal to said output portion and said input portion, generates a second mode switching signal for switching said multiplexer between the fifth and sixth modes in response to the sync signal, and applies the second mode switching signal to said multiplexer; and wherein:

said input portion is in the third mode during a predetermined period within a blanking period of the digital image data; and said multiplexer is in the fifth mode when the digital image data from said A/D convertor is in at least another period within the blanking period, other than the first period.

30. A video camera according to claim 27, further comprising a control data separating circuit for separating plural pieces of control data inputted from the image inputting device to said input portion through the signal line on the basis of the operation data, as the control data, and for applying the separated control data to said control circuits, said video camera has plural pieces of operation states as the operation states, and said control circuits control the plural pieces of operation states of said video camera in accordance with the plural pieces of control data separated by said control data separating circuit.

31. A video camera according to claim 30, wherein the plural pieces of operation states include the position of a lens and the position of an iris of an optical system of said video camera, said detecting circuits detect the positions of said lens and said iris and output data representing the positions of said lens and said iris so detected, as the operation data, and said control circuits control the positions of said lens and said iris in accordance with the plural pieces of control data separated by said control data separating circuit.

32. A video camera according to claim 26, wherein said imager is a charge-coupled device, said control circuits include a circuit connected between said imager and said A/D convertor, for executing co-related double sampling processing and automatic gain control for the output of said imager in accordance with the control data.

33. An image input device for inputting digital image data from a video camera through a signal line connected between the video camera and said image input device, and converting the digital image data to a data format used in an external information processing unit, said image input device comprising:

an input portion for inputting the digital image data inputted thereto through the signal line and for producing an output;

signal processing circuits for processing the digital image data from said input portion and converting the processed data to a data format used in the external information processing unit;

a control data generating circuit for generating and outputting control data for controlling the operation of the video camera;

an output portion for inputting the control data from said control data generating circuit, and for outputting the control data to the video camera through the signal line;

and a mode switching circuit for switching said input portion between a first mode in which said input portion can input the digital image data and a second mode in which said input portion cannot input the digital image data, and for switching said output portion between a third mode in which said output portion can output the control data when said input portion is in the second mode and a fourth which said output portion cannot output said control data when input portion is in the first mode.

34. An image input device according to claim 33, wherein said input portion inputs multiplexed data, generated by multiplexing the operation states of the video camera and the digital image data, from the video camera, and said image input device further comprises a data separating circuit for separating the multiplexed data inputted to said input portion through the signal line into the digital image data and the operation data, and for outputting the separated data, and wherein said signal processing circuits process the digital image data from said data separating circuit and convert the processed data to a data format used in the external information processing unit, and said control data generating circuit generates and outputs the control data on the basis of the operation data from said data separating circuit.

35. An image input device according to claim 33, wherein said mode switching circuit applies to said input portion and said output portion a mode switching signal, for switching said input portion between the first and second modes and for switching said output portion between the third and fourth modes, in synchronism with the sync signal, and wherein the third mode is set within a blanking period of the sync signal.

36. An image input device according to claim 33, further comprising an interface circuit applying the converted digital image data obtained by said signal processing circuit to the external information processing unit.

37. An image input device according to claim 33, wherein said signal processing circuits include conversion circuit for converting color components of the digital image data, and an interface circuit for applying the digital image data converted by said conversion circuit to the external information processing unit.

* * * * *